(12) United States Patent
Kasatochkin et al.

(10) Patent No.: US 11,473,690 B2
(45) Date of Patent: Oct. 18, 2022

(54) ELECTRIC ACTUATOR FOR CONTROLLING BALL VALVE

(71) Applicants: Vasilii Kasatochkin, Moscow (RU); Konstantin Siniagovskii, Moscow (RU)

(72) Inventors: Vasilii Kasatochkin, Moscow (RU); Konstantin Siniagovskii, Moscow (RU); Sergei Nazarov, Moscow (RU)

( * ) Notice: Subject to any disclaimer, the term of this patent is extended or adjusted under 35 U.S.C. 154(b) by 0 days.

(21) Appl. No.: 17/096,701

(22) Filed: Nov. 12, 2020

(65) Prior Publication Data

US 2021/0310576 A1 Oct. 7, 2021

Related U.S. Application Data

(60) Provisional application No. 62/899,445, filed on Sep. 12, 2019.

(51) Int. Cl.
*F16K 31/04* (2006.01)
*F16K 5/06* (2006.01)

(52) U.S. Cl.
CPC .......... *F16K 31/043* (2013.01); *F16K 5/0647* (2013.01)

(58) Field of Classification Search
CPC ....... F16K 31/043; F16K 31/047; F16K 31/05
See application file for complete search history.

(56) References Cited

U.S. PATENT DOCUMENTS

| RE20,471 E | * | 8/1937 | Kelty | F16K 31/05 |
| | | | | 137/552 |
| 2,745,294 A | * | 5/1956 | Kron | F16K 31/05 |
| | | | | 74/625 |
| 2,859,639 A | * | 11/1958 | Bryant | F16K 31/05 |
| | | | | 74/625 |
| 3,218,403 A | * | 11/1965 | Le Wan | F16K 31/05 |
| | | | | 200/61.86 |
| 3,248,080 A | * | 4/1966 | Plasko | F16K 31/043 |
| | | | | 251/185 |
| 4,046,350 A | * | 9/1977 | Massey | F16K 31/1635 |
| | | | | 137/556 |
| 4,056,984 A | * | 11/1977 | Kenealy | F16K 31/53 |
| | | | | 74/89.38 |
| 4,647,003 A | * | 3/1987 | Hilpert | F16K 31/1635 |
| | | | | 137/554 |
| 2010/0025610 A1 | * | 2/2010 | Eschborn | F16K 31/54 |
| | | | | 251/250 |

* cited by examiner

*Primary Examiner* — Umashankar Venkatesan
(74) *Attorney, Agent, or Firm* — Nadya Reingand

(57) ABSTRACT

Automating the control of ball valves (BV) in engineering systems is designed for water supply, ventilation, air conditioning and heating systems. An electric actuator (EA) streamlines the process of automation of engineering systems by saving money and time. The EA with a coupling device is fastened to the BV stem. The coupling device comprises an engagement adapter with projections, an adapter washer and a securing member. The reduction gear main shaft is provided with a through hole for receiving the BV stem and the securing member, and a seat provided on the side of the EA and BV stem joint. The adapter washer is placed in the main shaft seat and the engagement adapter is joined permanently with the EA case and engages the BV body with projections.

9 Claims, 1 Drawing Sheet

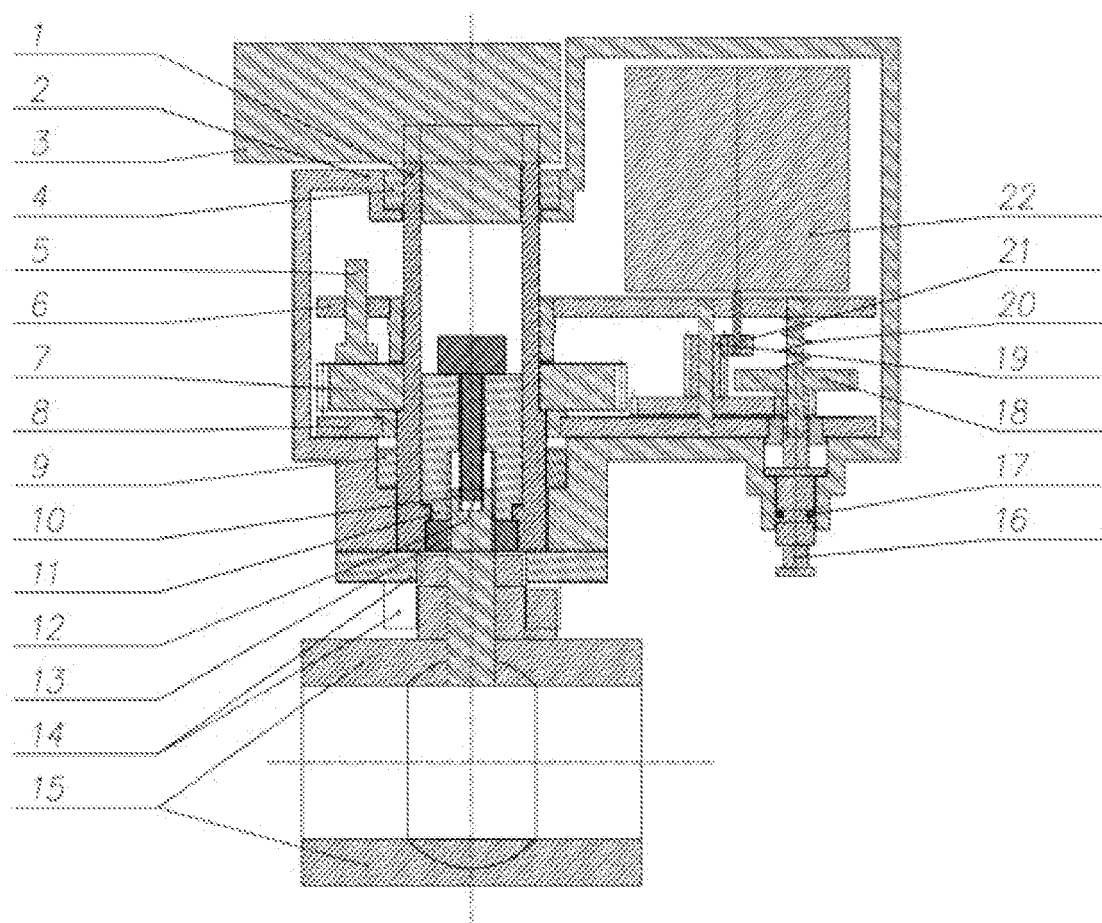

ELECTRIC ACTUATOR FOR CONTROLLING BALL VALVE

FIELD OF DISCLOSURE

The electric actuator relates to automation of ball valve (BV) control in engineering systems used for water supply, ventilation, air conditioning and heating.

BACKGROUND OF THE INVENTION

Presently, electric actuators (EA) are applied broadly in automating the control of the above-mentioned systems.

Known are integrated EA and BV sets used in water leakage protection systems made by many manufacturers, including GIDROLOK (https://gidrolock.ru/production/sharovoy-kran-s-elektroprivodom-gidrolock-professional/) and NEPTUN (https://neptun-mcs.ru/catalog/parts/valves_1/krany_sharovye_s_elektroprivodom_bugatti_pro/kran_sharovyy_s_elektroprivodom_bugatti_pro_12v/).

These EA are manufactured complete with a BV, though EA of one manufacturer will not match the BV of another manufacturer, and vice versa. When it is necessary to automate an installed and functioning engineering system, the installed BV is dismantled and a new one complete with an EA is installed. This involves big financial and labor expenditures. Besides, EA that can be installed on low-cost off-the-shelf BV are unavailable.

Known in the art is a detachable EA with a reduction gear mounted on a bracket attached to a water supply pipe. The BV is controlled by a lever coupled to the EA reduction gear that engages the lever on the BV stem (https://youtu.be/JFmePOsFlnA).

This EA has the following drawbacks:

It can control only a BV with a lever on the stem and is unfit, for instance, for controlling a BV provided with a butterfly on the stem;

The shape of the clamp and the big size of the bracket for fastening the EA on the water supply pipe allow using it only with a small-size BV and a small opening and closing torque;

A bulky design when the EA is mounted on top of the BV;

Complicated manual adjustment to ensure alignment of EA and BV installation and secure the open and closed positions.

Complicated installation and unreliable design owing to many connection and adjustment screw joints.

BRIEF SUMMARY OF THE INVENTION

The offered EA design enables automating installed and functioning engineering systems (heating, water supply, air conditioning, and ventilation) without dismounting virtually all off-the-shelf BV, including BV with a polypropylene casing. This saves a great deal of time and money and streamlines the automation of engineering systems.

The offered design of the EA enables to mount it directly on the BV stem, making it needless to join the electric actuator case and the ball valve body. It suffices to engage the case and body to transfer the torque from the EA main shaft to the BV stem, thus making the design more space saving and reliable.

The principle of flexibility related to BV type, size and different manufacturers is achieved by using a set of coupling devices.

BRIEF DESCRIPTION OF THE DRAWING

The FIGURE is an illustration of the electric actuator for a ball valve (cross-section view).

1—Main shaft
2—EA case
3—Manual opening handle
4—Upper gland
5—Limit switch actuating pin
6—Upper plate
7—Main gear
8—Bottom plate
9—Bottom gland
10—BV stem
11—Retaining nut
12—Retaining screw
13—Adapter washer
14—Engagement adapter
15—BV body
16—Release button
17—Release gland
18—Release gear
19—Intermediate gears (conventionally only one is shown)
20—Retracting spring
21—Electric motor gear
22—Electric motor

DETAILED DESCRIPTION OF THE INVENTION

Referring the FIGURE, the EA includes main shaft 1 installed inside EA case 2. In the upper part, main shaft 1 has grooves to receive manual opening handle 3. Press fitted under manual opening handle 3 in EA case 2 is upper gland 4, which is fitted onto main shaft 1 to prevent moisture ingress into EA case 2. Limit switch actuating pin 5 limits the extreme positions of the EA angle of rotation. Limit switch actuating pin 5 passes through a hole in upper plate 6 and is attached to main gear 7 fastened on main shaft 1. Bottom plate 8 is joined to upper plate 6 with a screw joint. Bottom gland 9 is press fitted in the bottom part of EA case 2 and fitted also onto main shaft 1 to prevent moisture ingress into EA case 2. The EA is mounted on BV stem 10 via a hole in main shaft 1. If BV stem 10 has an external screw thread, EA is mounted using a securing member in the form of retaining nut 11. If BV stem 10 has an internal screw thread, EA is mounted using a securing member comprising retaining nut 11 and retaining screw 12. Adapter washer 13 is placed in a matching-in-shape seat in main shaft 1 and rests against the lands on BV stem 10. Engagement adapter 14 is rigidly fastened on EA case 2 and, owing to the projections, engages BV body 15. Retaining nut 11, retaining screw 12, adapter washer 13 and engagement adapter 14 are all part of the coupling devices to ensure a fixed joint of EA and BV.

EA is controlled manually using release button 16, fitted onto which is release gland 17 to prevent moisture ingress into the EA case. Release gear 18 is movably fitted onto the axle and maintained in engagement with intermediate gears 19 by action of retracting spring 20. The EA reduction gear comprises main shaft 1 and fitted thereon main gear 7; a set of intermediate gears 19 and release gear 18, which are mounted on shafts secured between upper plate 6 and bottom plate 8; and electric motor gear 21 fastened on the shaft of electric motor 22. Electric motor 22 is rigidly fastened on upper plate 6 with the possibility of rotating in two opposite directions.

Principle of Operation

In the automatic mode, the torque from the shaft of electric motor 22 is transmitted via electric motor gear 21 and through a set of intermediate gears 19 and release gear 18 to main gear 7 and main shaft 1. Main shaft 1, rigidly joined via adapter washer 13 and secured with a retaining member to BV stem 10, transmits the torque to BV stem 10 to open or close the BV.

To prevent the rotation of EA case 2 relative to the BV, engagement adapter 14 with projections is provided. EA motion is stopped and the EA is secured in extreme positions with the help of limit switch actuating pin 5. In its extreme positions, the pin depresses the limit switches to break the electric circuit and prohibit further electric motor rotation in the given direction.

In the manual mode, depressed release button 16 acts on release gear 18 to disengage it from intermediate gears 19. Main shaft 1 is disengaged from the electric motor shaft, and manual opening handle 3 is used to open or close the BV.

The invention claimed is:

1. An electric actuator (EA) for controlling a ball valve (BV), comprising:
    an electric motor, comprising a gear and a shaft;
    a set of intermediate gears and a release gear connected to the electric motor;
    a reduction gear comprising a main shaft and a fitted main gear, the reduction gear installed inside an EA case, the main shaft having a through hole and a seat having a shape; and
    a coupling device to fasten the EA on a BV stem having a thread, wherein the coupling device comprises:
        an adapter washer having a shape matching the shape of the seat in the main shaft of the reduction gear, the adapter washer placed in said seat and resting against lands on the BV stem;
        an engagement adapter with projections, the engagement adapter rigidly fastened on the EA case to engage a BV body with the projections; and
        a securing member to secure the EA on the BV stem, when the EA is mounted on the BV stem via the through hole in the main shaft of the reduction gear, wherein the securing member is one of a retaining nut, or a retaining nut and a retaining screw, wherein the retaining nut has a thread corresponding to the thread of the BV stem.

2. The EA of claim 1, wherein the securing member is the retaining nut, when the BV stem has an external screw thread.

3. The EA of claim 1, wherein the securing member comprises the retaining nut and the retaining screw, when the BV stem has an internal screw thread.

4. The EA of claim 1, wherein the main shaft has grooves to receive a manual opening handle.

5. The EA of claim 1, wherein the EA comprises a limit switch actuating pin to limit the extreme positions of an EA angle of rotation.

6. The EA of claim 5, wherein the limit switch actuating pin passes through a hole in an upper plate of the EA and is attached to the main gear fastened on the main shaft.

7. The EA of claim 1, wherein the EA is operated in an automatic mode, the automatic mode comprising transmitting a torque from the shaft of the electric motor via the electric motor gear and through the set of the intermediate gears and the release gear to the main gear and the main shaft, wherein the main shaft is rigidly joined via the adapter washer and secured with the retaining member to the BV stem, thus transmitting the torque to the BV stem to open or close the BV.

8. The EA of claim 7, wherein the rotation of the EA case relative to the BV is prevented by the engagement adapter, the EA is secured in extreme position with the help of a limit switch actuating pin, wherein the limit switch actuating pin depresses the limit switches to break the electric circuit and prohibit further electric motor rotation in a given direction.

9. The EA of claim 1, wherein the EA is operated in a manual mode, the EA comprising a release button which acts on the release gear to disengage the release gear from the set of the intermediate gears, thus disengaging the main shaft from the electric motor shaft, and a manual opening handle is used to open or close the BV.

* * * * *